May 1, 1923.
G. ENGEL, SR
1,453,313
DEALCOHOLIZING PROCESS AND APPARATUS
Filed Oct. 18, 1920 2 Sheets-Sheet 1
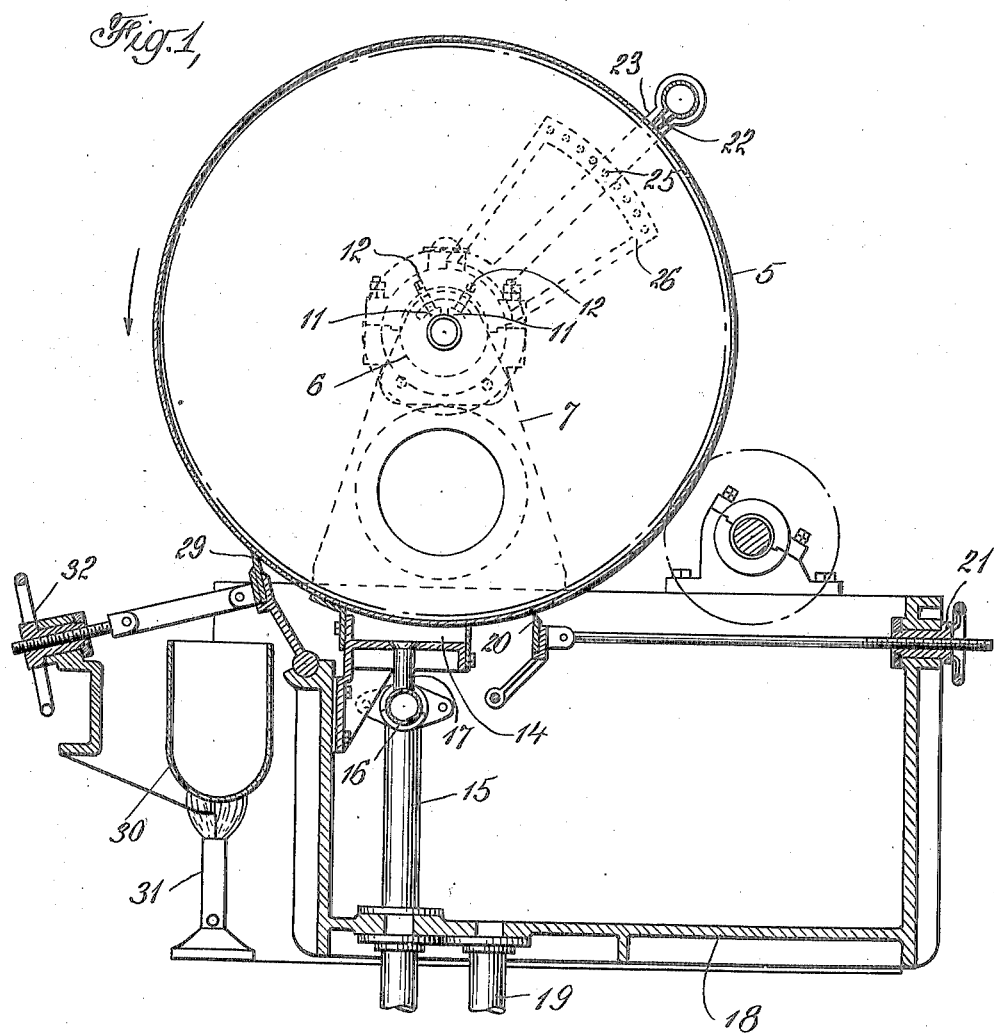
Inventor
Godfrey Engel Sr.
By his Attorney
E. W. Marshall

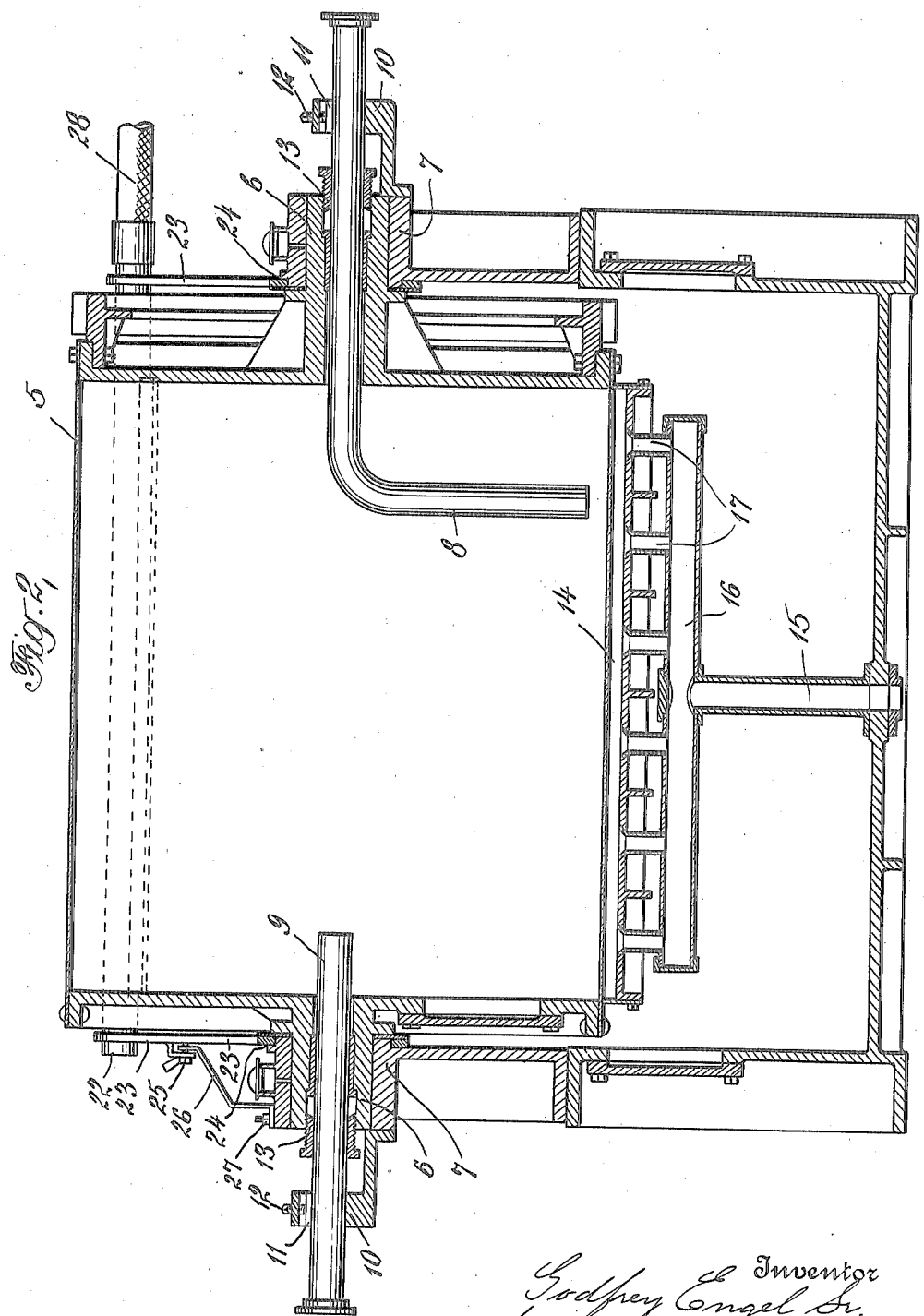

Patented May 1, 1923.

1,453,313

UNITED STATES PATENT OFFICE.

GODFREY ENGEL, SR., OF BROOKLYN, NEW YORK, ASSIGNOR TO BUFFALO FOUNDRY & MACHINE CO., OF BUFFALO, NEW YORK, A CORPORATION OF NEW YORK.

DEALCOHOLIZING PROCESS AND APPARATUS.

Application filed October 18, 1920. Serial No. 417,696.

*To all whom it may concern:*

Be it known that I, GODFREY ENGEL, Sr., a citizen of the United States, and a resident of Brooklyn, county of Kings, and State of New York, have invented certain new and useful Improvements in Dealcoholizing Processes and Apparatus, of which the following is a specification.

My present invention relates to the de-alcoholizing of beer and the like, and the objects of the invention are to enable the removal of the alcohol from the beer or other material by a continuous operation which can be readily controlled to effect the desired results. Other objects are to accomplish the de-alcoholization rapidly and efficiently.

In my invention the separation of the alcohol from the beer or other material is effected by freezing the body of the beer onto a traveling surface, such as the face of a rotating drum and then removing the alcohol adherent to the frozen film on such traveling surface.

In the drawings accompanying and forming a part of this specification, I have illustrated a simple form of apparatus for carrying out the invention, but wish it understood that the structure may be modified in various ways without departure from the true spirit and scope of the invention as hereinafter defined and claimed.

In the drawings referred to, Figure 1 is a vertical sectional view of the apparatus taken on a plane transverse to the axis of the freezing drum.

Figure 2 is a longitudinal sectional view of the machine.

5 designates the freezing drum which is a thin walled cylindrical vessel having end hubs 6 journaled in suitable bearings 7.

A saline or other freezing solution is applied to the interior of this drum by a pipe 8 which is led in through one of the hollow hubs of the drum and the overflow is conducted off by another pipe 9 extending out through the other hollow hub of the drum. These pipes are held against rotation in the illustration by special bearings 10 each having a pair of opposed spring clamping fingers 11, which are forced into clamping engagement over the pipe by set screws 12. Stuffing boxes are indicated at 13 to prevent leakage where the relatively stationary pipes enter the hubs of the drum. The bearings 10 for the inlet and outlet pipes are lined up with the tubular passages through the hubs and the clamping wings 11 are formed usually as an integral part of such bearings and are shaped to fit the surface of the pipes so that the clamps thus provided not only serve to hold the pipes against rotation but also serve to accurately center the pipes with respect to the hubs of the drum.

The beer or other material is supplied to the outer surface of the drum in the present instance, by a tank 14 having walls shaped to closely approximate the cylindrical surface of the drum, the beer or other material being led to this tank by piping 15 shown as having a manifold connection 16 connected with the tank at a plurality of points by branches 17.

The beer supply tank 14 is shown as supported in a larger tank or reservoir 18 arranged to catch any overflow, said tank having a suitable pipe connection 19 for returning the overflow.

The freezing solution is usually introduced into the lower portion of the drum at a temperature of approximately 0° F., and the beer or other material under treatment is brought into contact with the surface of the drum and cooled to a temperature of approximately 32° F. This results in substantially instantaneous freezing of the beer in contact with the surface of the drum and the formation of a thin film of ice which adheres to the outer surface of the drum. The thickness of this film may be governed by a scraper blade such as I have indicated at 20 and which is regulated by an adjusting nut 21.

As the beer freezes and takes up the rotation of the drum the alcohol clings to the coating of ice and therefore travels along with the drum but at a slower rate of speed. This upwardly traveling film of alcohol is collected and removed by means consisting in the illustration of a suction nozzle 22 extending across and supported with its mouth closely adjacent the frozen surface. In order that this nozzle may operate at the proper point, I have shown the same as supported at its ends by radial arms 23 pivotally engaged on the journaled bearings 7 at 24 and held in adjusted relation by means of a securing pin or key 25 passed through openings formed in a segment 26 into engagement with a corresponding opening in one of the arms 23. To permit of a further degree of adjustment the holding segment 26 may be adjustably secured in position on the journalled bearing as by means of fastening bolts indicated at 27.

When the alcohol collecting nozzle is set at the proper point to remove the alcohol from the frozen surface, suction is applied as by means of a flexible hose 28 connected with one end of the nozzle and the alcohol is thereby withdrawn and separated from the beer while the latter is in the frozen state.

After removal of the alcohol the beer may be restored to liquid form as by means of a scraper indicated at 29 positioned to scrape the frozen matter from the surface of the drum into a collecting trough 30 which may be suitably heated as by means of Bunsen burners indicated at 31. The scraper blade is shown as adjustable by means of a wheel 32.

The temperature of the freezing liquid entering the drum and the rate of travel of the same through the drum and the temperature of the beer and the rate at which it is supplied to the outside of the drum, are all governed to effect the best results. The operation may be modified also by turning the angular end of the supply pipe 8 to deliver the freezing solution at points near it or further removed from the beer supply trough 14. The rate of rotation of the drum, the thickness of the ice film, the position of the alcohol removing nozzle, the action of the ice removing scraper and the melting of the frozen material removed from the drum are all factors which are readily controllable to secure the best results.

The operation may be carried on continuously and as the necessary heat transfer is relatively low, the operation is an efficient one and can be carried on rapidly and economically.

What I claim is:

1. In apparatus of the character disclosed a rotary drum, means for supporting a body of refrigerated material in contact with the outer surface of the drum, means for supplying a freezing medium to the interior of the drum to thereby freeze a film of the material onto the surface of the drum, a liquid collector adjustably supported with reference to the drum and adapted to remove liquid adhering to the frozen film and means for removing the frozen film from the drum after such removal of the liquid therefrom.

2. In a machine of the character described, a rotary drum, means for supplying a freezing medium to the interior of the same, means for supporting a body of refrigerated material in contact with the outer surface of said drum, and means for regulating the thickness of the film freezing to the surface of the drum including a blade extending across the face of the drum and means for positively shifting the same toward and away from such face of the drum.

3. In a machine of the character described, a rotary drum, means for supplying a freezing medium to the interior of the same, means for supporting a body of refrigerated material in contact with the outer surface of said drum, means for removing the frozen film from the surface of the drum, and means for melting the removed frozen matter.

4. In a machine of the character described, a rotary drum, means for supplying a freezing medium to the interior of the same, means for supporting a body of refrigerated material in contact with the outer surface of said drum, means for removing the liquid part of the material which may adhere to the frozen surface on the drum and means for removing the frozen crust from the drum after it has thus been freed of the adherent liquid.

5. In a machine of the character described, a rotary drum, means for supplying a freezing medium to the interior of the same, means for supporting a body of refrigerated material in contact with the outer surface of said drum, means for collecting the liquid part of the material which may adhere to the frozen surface, and comprising a suction nozzle operating closely adjacent the surface of the frozen film and adjustable to various positions angularly about the drum.

6. Beer de-alcoholizing apparatus comprising a rotary drum, means for supplying a freezing medium to the interior of the drum, a tank for supporting a body of refrigerated beer in contact with the exterior lower surface of the drum and an alcohol collector adjustably supported with reference to the outer surface of the drum.

7. Beer de-alcoholizing apparatus comprising a rotary drum, means for supplying a freezing medium to the interior of the drum, a tank for supporting a body of refrigerated beer in contact with the exterior lower surface of the drum, and an alcohol collector adjustably supported with reference to the outer surface of the drum, and consisting of a suction nozzle extending lengthwise of the drum and adjustably supported angularly about the axis of the drum.

8. Beer de-alcoholizing apparatus comprising a rotary drum, means for supplying a freezing medium to the interior of the drum, a tank for supporting a body of refrigerated beer in contact with the exterior lower surface of the drum, an alcohol collector adjustably supported with reference to the outer surface of the drum, and means for removing the frozen crust from the drum after the removal of the alcohol therefrom, and means for restoring the removed frozen matter to liquid form.

9. In apparatus of the character described, a rotary drum having tubular supporting hubs provided with stuffing boxes, supply and outlet pipes entered through said stuffing boxes, bearings supporting said pipes in alignment with the stuffing boxes and having elastic clamping wings conforming to the surface of the pipes, and set screws for holding said clamping wings in clamping engagement with the pipes.

10. The method of de-alcoholizing beer which comprises subjecting the beer with its normal alcohol content to freezing conditions while in contact with a traveling chilled surface to thereby create an ice film on said surface to which the alcohol will cling in the travel of the chilled surface, and then removing the adherent film of alcohol from the frozen crust.

11. The method of de-alcoholizing beer which comprises subjecting the beer with its normal alcohol content to freezing conditions while in contact with a traveling chilled surface to thereby create an ice film on said surface to which the alcohol will cling in the travel of the chilled surface, removing the adherent film of alcohol from the frozen crust, and finally removing the frozen matter from the supporting surface and melting the same to liquid condition.

12. In apparatus of the character disclosed, means for supporting a body of refrigerated material, a traveling support positioned to dip into the body of refrigerated material, means for subjecting the support to the influence of a freezing medium, whereby to freeze a film of the material onto the surface of the traveling support, a liquid collector positioned to remove liquid adhering to the frozen film at one point in the travel of the support and means positioned to subsequently remove the frozen film from the support.

In witness whereof, I have hereunto set my hand this 5th day of October, 1920.

GODFREY ENGEL, Sr.